(12) United States Patent
Lin et al.

(10) Patent No.: US 11,155,648 B2
(45) Date of Patent: Oct. 26, 2021

(54) BIOPOLYMER EXTRACTION

(71) Applicant: HaskoningDHV Nederland B.V., Amersfoort (NL)

(72) Inventors: Yuemei Lin, Delft (NL); Salah Al-Zuhairy, Delft (NL); Mario Pronk, Delft (NL); Marinus Cornelis van Loosdrecht, Delft (NL)

(73) Assignee: HASKONINGDHV NEDERLAND B.V., Amersfoort (NL)

( * ) Notice: Subject to any disclaimer, the term of this patent is extended or adjusted under 35 U.S.C. 154(b) by 0 days.

(21) Appl. No.: 15/374,883

(22) Filed: Dec. 9, 2016

(65) Prior Publication Data

US 2017/0088637 A1    Mar. 30, 2017

Related U.S. Application Data

(63) Continuation of application No. PCT/NL2015/050432, filed on Jun. 11, 2015.

(30) Foreign Application Priority Data

Dec. 6, 2014   (NL) ..................................... 2012987

(51) Int. Cl.
    *C02F 11/06*    (2006.01)
    *C08B 37/00*    (2006.01)
    *C02F 11/127*   (2019.01)

(52) U.S. Cl.
    CPC .......... *C08B 37/0084* (2013.01); *C02F 11/06* (2013.01); *C02F 11/127* (2013.01); *C08B 37/0003* (2013.01); *C08B 37/006* (2013.01); *Y02W 10/40* (2015.05)

(58) Field of Classification Search
    None
    See application file for complete search history.

(56) References Cited

U.S. PATENT DOCUMENTS

| | | | |
|---|---|---|---|
| 3,824,997 A * | 7/1974 | Franklin | A61L 15/28 424/400 |
| 3,856,625 A | 12/1974 | Imrie | |
| 4,104,460 A * | 8/1978 | Hasebe | C08B 37/0084 204/157.68 |
| 7,838,641 B2 * | 11/2010 | Hjelland | A23L 29/256 536/123.1 |
| 10,570,304 B2 * | 2/2020 | Koenders | C09D 5/1656 |
| 2004/0202771 A1 * | 10/2004 | Lee | A23K 10/26 426/641 |

FOREIGN PATENT DOCUMENTS

WO    2015/190927    12/2015

OTHER PUBLICATIONS

Lieleg et al. "Mechanical robustness of Pseudomonas aeruginosa biofilms". Soft Matter. 2011 ; 7(7): 3307-3314.*
Zhang et al. "Comparison of different methods for sludge lysis". Research Journal of Chemistry and Environment. 2008, 12(3), 12-17.*
Jiatian Lin et al. "Sludge reduction in an activated sludge sewage treatment process by lysis-cryptic growth using ClO2-ultrasonication disruption". 2012, Biochemical Engineering Journal, 68, pp. 54-60.*
Volpe et al. "Use of a slime producing microorganism to enhance biomass settleability in activated sludge and ASB systems", 1998, International Environmental Conference & Exhibit, Vancouver, B. C., Apr. 5-8, 1998, vol. Bk. 2,789-809. TAPPI Press: Atlanta, Ga.*
Zhang et al. "Comparison of different methods for sludge lysis". Research Journal of Chemistry and Environment. 2008, 12(3), pp. 12-17.*
Lingling Wang et al. "Effect of hypochloride pretreatment on the disintegration of excess sludge". Advance Materials Research. 2014, vols. 864-867, pp. 1333-1336, published on line Dec. 13, 2013.*
Lin, et al., "Characterization of alginate-like exopolysaccharides isolated from aerobic granular sludge in pilot-plant", Water Research, vol. 44, 2010, 3355-3364.

* cited by examiner

*Primary Examiner* — Vera Afremova
(74) *Attorney, Agent, or Firm* — Peacock Law P.C.; Janeen Vilven

(57) ABSTRACT

In a prior art reactor set up dense aggregates of microorganisms are formed, typically in or embedded in an extracellular matrix. Such may relate to granules, to sphere like entities having a higher viscosity than water, globules, a biofilm, etc. The dense aggregates comprise extracellular polymeric substances, or biopolymers, in particular linear polysaccharides. The present invention is in the field of extraction of a biopolymer from a granular sludge, a biopolymer obtained by such method, and a use of such method.

13 Claims, 2 Drawing Sheets

BIOPOLYMER EXTRACTION

CROSS-REFERENCE TO RELATED APPLICATIONS

This application is a continuation application of International Application PCT/NL2015/050432, entitled "Biopolymer extraction", to Technische Universiteit Delft, filed on Jun. 11, 2015, which claims priority to Netherlands Patent Application Serial No. 2012987, filed Jun. 12, 2014, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COM-PACT DISC

Not Applicable.

COPYRIGHTED MATERIAL

Not Applicable.

FIELD OF THE INVENTION (TECHNICAL FIELD)

The present invention is in the field of extraction of a biopolymer from a granular sludge, a biopolymer obtained by said method, and a use of said method.

BACKGROUND OF THE INVENTION

In a prior art reactor set up a (non-axenic) bacteria culture may be fed with a suitable carbon sources, in an aqueous environment. Therein dense aggregates of microorganisms are formed, typically in or embedded in an extracellular matrix. Such may relate to granules, to sphere like entities having a higher viscosity than water, globules, a biofilm, etc.

At present, the sludge produced from, e.g., wastewater treatment processes, including granular sludge, is considered as a waste product, having no further use. On top of that, costs of waste disposal are high.

Surprisingly, it has been found that extracellular polymeric substances, in particular linear polysaccharides, obtainable from granular sludge can be produced in large quantities.

Granules making up granular sludge are (dense) aggregates of microbial cells self-immobilized through extracellular polymeric substances into a spherical form without any involvement of carrier material. A characterizing feature of granules of granular sludge is that they do not significantly coagulate during settling (i.e., in a reactor under reduced hydrodynamic shear). Extracellular polymeric substances make up a significant proportion of the total mass of the granules.

Extracellular polymeric substances comprise high-molecular weight compounds (typically >5 kDa) secreted by microorganisms into their environment. Extracellular polymeric substances are mostly composed of polysaccharides and proteins, and may include other macro-molecules such as DNA, lipids and humic substances.

Advantageously, granules of granular sludge can be readily removed from a reactor by e.g. physical separation, settling, centrifugation, cyclonic separation, decantation, filtration, or sieving to provide extracellular polymeric substances in a small volume. Compared to separating material from a liquid phase of the reactor this means that neither huge volumes of organic nor other solvents (for extraction), nor large amounts of energy (to evaporate the liquid) are required for isolation of the extracellular polymeric substances.

Extracellular polymeric substances obtainable from granular sludge (preferably obtained from granular sludge) do not require further purification or treatment to be used for some applications, hence can be applied directly. When the extracellular polymeric substances are obtained from granular sludge the extracellular polymeric substances are preferably isolated from bacteria (cells) and/or other non-extracellular polymeric substances.

However, for various applications the extracellular polymeric substances, in this document also referred to as "biopolymers", can not be used directly, e.g. in view of insufficient purity, a typical (brownish) coloring of the extracellular polymeric substances, etc.

With the term "microbial process" here a microbiological conversion is meant.

Some documents recite isolation of alginate from aerobic granular sludge.

Li et al. in "Characterization of alginate-like exopolysaccharides isolated from aerobic granular sludge in pilot plant", Water Research, Elsevier, Amsterdam, NL, Vol. 44, No. 11 (Jun. 1 2010), pp. 3355-3364) recites specific alginates in relatively raw form. These alginates are typically not suited for further use as these are at least partially colored. In the process active carbon may be used, but that is mainly for removing impurities from the solution. Also the lipid content of the alginates is rather low (<1 wt. %).

U.S. Pat. No. 3,856,625 A recites an alginate-type polysaccharide is obtained by the aerobic cultivation of a bacterium of the species *Azotobacter vinelandii* in an aqueous nutrient medium containing sources of carbon, molybdenum, iron, mangesium, potassium, sodium, sulfate, calcium and phosphate. The carbon source comprises at least one monosaccharide or disaccharide. Contrary to normal culture conditions for this bacterium, for good polysaccharide production, the phosphate concentration in the nutrient medium is 0.1-0.8 millimolar, and the pH of the medium is maintained within the range of from 7.0 to 8.2.

The present invention relates to a method of extraction of a biopolymer from a granular sludge, a biopolymer obtained by said method, and a use of said method, which overcomes one or more of the above disadvantages, without jeopardizing functionality and advantages.

BRIEF SUMMARY OF THE INVENTION

The present invention relates in a first aspect to a method according to claim 1. There with a simple and effective method is presented for extracting biopolymers from dense aggregates formed by microbial organisms. The method specifically relates to extracting an anionic biopolymer. In a step of the method the pH is increased by addition of at least 1-20% v/v of at least one of Cl2, OCl— and H2O2. The addition of the Cl2, OCl— or H2O2 is found to cause discoloration of the biopolymer. This step may be performed at an elevated temperature, or at an (close to) environmental temperature. The present method is typically carried out in a reactor. The extraction is preferably carried out under mixing, such as by stirring. After increasing the pH the biopolymer may be extracted by one or more subsequent steps.

The obtained biopolymers resemble those of the prior art, but are different in certain aspects, such as characterized in the claims; i.e., chemical and physical characteristics are different, such as a lipid content is much higher (2-5 wt. %). The different characteristics result in different applications of the present biopolymers now being possible, or likewise being impossible, compared to those of the prior art. So apart from the discoloration obtained, which is much better than the only partial discoloration (so not effective) of, e.g., Lin et al., the present biopolymers are different in various technical aspects.

In the present application amounts are calculate on a total volume, or total weight, of the dense aggregates, unless stated otherwise.

It is noted that numbering of the various steps are given for a better understanding of an optional sequence of the steps. Some of the steps may be performed in a different order, and/or at a later or earlier stage.

Thereby the present invention provides a solution to one or more of the above mentioned problems.

Advantages of the present invention are detailed throughout the description.

DETAILED DESCRIPTION OF THE INVENTION

The present invention relates in a first aspect to a method according to claim 1.

The present method may be further optimized by in an initial stage removing larger particles, such as by sieving. Preferably particles with a diameter larger than 500 µm are removed, more preferably particles larger than 300 µm, such as larger than 200 µm. Therewith it has been found that the present method is more effective, less energy consuming, and a higher yield of biopolymer is obtained.

The present method may be further optimized by removing part of the water being present, thereby increasing an amount of aggregates. In an example, after providing the sludge, water is removed to a 1-40% w/v content of the wet sludge, more preferably 5-38% w/v, even more preferably 10-35% w/v, even more preferably 20-32% w/v, such as 25-30% w/v. For better understanding also a solid contents fraction may be used. In the latter case solid contents are typically in the range of 0.1-30% w/w, preferably 1-10% w/w, most preferably 4-10% w/w, such as 5-8% w/w. The present method is found to be more effective if part of the water is removed in an initial stage.

In an example the present method comprises the step of (iiia) reducing the pH, preferably until gel formation, such as to a pH of 2-4, by addition of an acid, such as HCl. The present biopolymer is now obtained in an acid form. As such the biopolymer can be collected with ease.

In an example of the present method comprises the step of after reducing the pH (iiib) removing the sludge by one or more of physical separation, settling, centrifugation, cyclonic separation, decantation, filtration, sieving, and flotation, under suitable conditions. Especially good results have been obtained by centrifuging the sludge.

In an example of the present method the biopolymer is bacterial aerobic granular sludge or anammox granular sludge, and is selected form exopolysaccharide, preferably comprising mannuronic acid and guluronic acid residues, block-copolymers comprising uronic acid residues, alginate, lipids, and combinations thereof, or wherein the biopolymer is an algae biopolymer. Especially bacterial aerobic granular sludge or anammox granular sludge has been found to produce high amounts of biopolymers, in good quality. By nature the biopolymers produced as such vary in their characteristics, e.g., composition, molecular weight, etc.

In an example of the present method the granular sludge has been substantially produced by bacteria belonging to the order Pseudomonadaceae, such as *pseudomonas* and/or *Acetobacter* bacteria (aerobic granular sludge); or, by bacteria belonging to the order Plancto-mycetales (anammox granular sludge), such as *Brocadia anammoxidans, Kuenenia stuttgartiensis* or *Brocadia fulgida*; or, combinations thereof.

In an example of the present method step (iic) further comprises addition of one or more of a salt comprising a base, such as bicarbonate, hydroxide, and thick bleach, preferably a monovalent salt thereof, such as a Na-salt and a K-salt, an oxidant, such as ozone, and peroxide. Therewith the quality, homogeneity and yield of the biopolymer can be further optimized.

In an example of the present method after step (iic) (a) the temperature is increased to 50-100° C., such as tot 80-85° C., during a period of 10-60 min, such as 20-30 min, preferably under stirring, or (b) the temperature is maintained at 10-30° C., such as at 15-20° C., during a period of 60-2880 min, such as 120-1440 min, preferably under stirring. So at least two variants exist, one with a relative higher temperature and a relative shorter processing time, and one with a relative lower temperature and a relative longer processing time. In view of energy consumption the latter variant is preferred.

In an example of the present method after step (iic) a suspension of the sludge is centrifuged, such as at 2000-6000 rpm, during 10-45 minutes, and a supernatant is collected for further processing.

In an example of the present method after step (iiia) (iiib) the acidic gel is centrifuged, such as at 2000-6000 rpm, during 10-45 minutes, and a supernatant is collected for further processing.

In an example of the present method the extracted biopolymer is further treated, such as by precipitation, such as by addition of an alcohol, by desalination, by osmosis, by reverse osmosis, by salt-formation, such as Na-salt, by neutralising, by adding a base, by drying, by storing, and by freezing. Therewith a product is obtained that can be used in a further application, that can be sold, and that can be stored.

In a second aspect the present invention relates to a use of the present method for discolouring biopolymers obtained from aerobic granular sludge or from algae. It has been found that particular in this respect the present method is very suited.

In a third aspect the present invention relates to a special biopolymer, obtained by the present method. The present biopolymers may be characterized by various parameters. They may be different in various aspects from e.g. known comparable chemically or otherwise obtainable polymers, such is in viscosity behaviour, molecular weight, hydrophobicity, lipid content, microstructure (as can be observed under an electron microscope), etc. For instance, the lipid content of the present biopolymers is much higher than those of prior art comparable biopolymers, namely 2-5 wt. %, such as 3-4 wt. %. Analyses of an exemplary biopolymer using a PerkinElmer 983 double beam dispersive IR spectrometer shows approximately 3.2 wt. % peaks that are attributed to lipids. Typically the present biopolymers are also less pure, i.e., a mixture of polymers is obtained.

The present biopolymer may relate to an alginate, such as ALE. This is different from the alginates e.g. obtainable by the above pilot plant alginates in various aspects. For instance it may have a decreasing dynamic viscosity with increasing shear rate (@ 25° C.), wherein a relative decrease is from 5-50% reduction in dynamic viscosity per 10-fold increase in shear rate. It may have a dynamic viscosity of >0.2-1 Pa*s (@ 25° C., @ shear rate of 1/sec). It may have a number averaged weight of >10,000 Dalton, preferably >50,000 Da, such as >100,000 Da. It may have a hydrophilic part and hydrophobic part. It may relate to a discoloured biopolymer. And it may relate to combinations of the above.

In an example of the present biopolymer it may have >30% with a molecular weight of >300,000 Da, >10% with a molecular weight of >100,000 Da, >15% with a molecular weight of >5,000 Da, and <10% with a molecular weight of <5,000 Da.

In a third aspect the present invention relates to a use of the present biopolymer in one or more of a stiff or flexible coating, such as a coating for steel, for concrete, for food, such as cheese, for packaging, such as for food packaging, for anti-graffiti, for optics, for polymer feed stock, for catalysis, for mixed (nano)composites, such as clay-alginate-silicate, and graphene-alginate, as a paper additive, for a self-healing coating, for medical application, as an additive in general, for an electrochemical device, such as a battery, and for separation, such as gas separation.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

DETAILED DESCRIPTION OF FIGURES

Figure 1A:
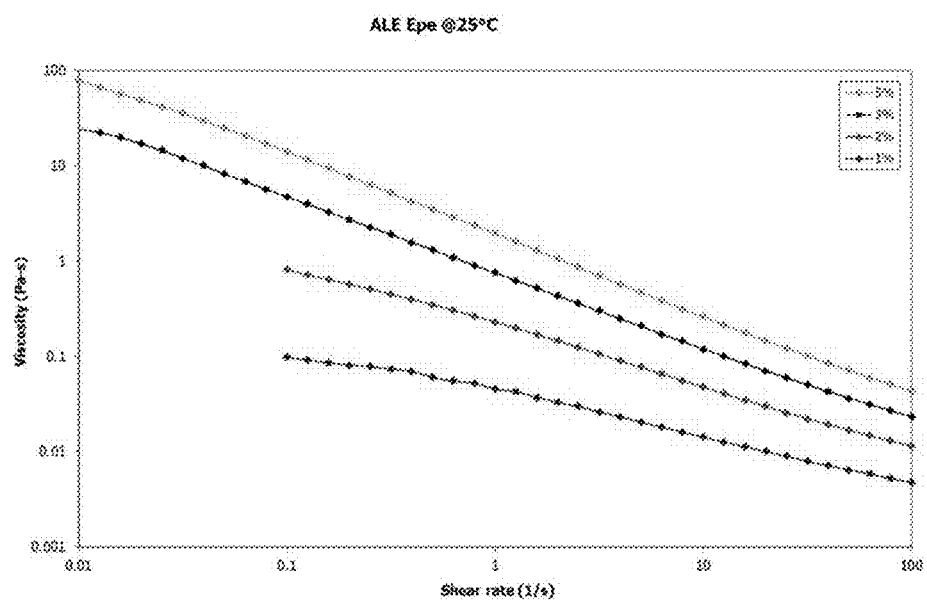
FIG. 1a-1c shows the effect of shear rate on viscosity of ALE and commercial alginate.

The figures are further detailed in the description of the experiments below.

Examples/Experiments

The invention although described in detailed explanatory context may be best understood in conjunction with the accompanying examples and figures.

Below exemplary embodiments of a method of extraction of a specific biopolymer (microbial alginate; ALE) is given. Note that various steps are optional.

Hot Extraction of ALE from Granular Sludge
1) Sieve the granular sludge to collect granules diameter more than 200 μm, then wash with tap water.
2) Remove the excess water using tissue paper placed under the sieve.
3) Before starting the extraction, take ±1 gram of sludge for dry weight determination. Measure the empty cup, the filled cup and put in the oven (105° C.) to dry. Weigh again if dried.
4) Prepare granules suspension in tap water with a Total Solids TSS content of about 3%. This corresponds with 30-35 gram wet weight sludge in a total volume of 100 mL. Before adding the water, preheat it to save time in step 5.
5) Add thick bleach solution to reach 10% (v/v).
6) Mix thoroughly and place the suspension in a water bath on a hotplate stirrer set to 80° C. and 400 rpm, for 30 min. Add aluminium foil to the top to prevent evaporation.
7) Collect the suspension in 50 mL tubes and centrifuge the liquor at 4500 rpm for 20 min. Collect the supernatant in a glass beaker and discard the pellet.
8) Adjust the supernatant pH to 2.5 by adding 4 M HCl on a magnetic stirrer. Collect the acidic gel in 50 mL tubes.
9) Centrifuge the acidic gel at 4500 rpm for 10 min, and then collect the pellet.
10) The acidic gel can be stored at 4° C. or frozen.

The gel can be further prepared according to purpose/client for example in the following ways:
(a) To prepare Na-ALE.
(b) To precipitate the Na-ALE, and
(c) To prepare salt-free/low salt Na-ALE by desalination.
(a) To prepare Na-ALE:
Add 0.5 M NaOH to the acidic gel to reach the required concentration.
(b) To precipitate the Na-ALE:
Add ethanol 1:1 volume. Discard the supernatant and let the Na-ALE to dry in the oven at 85° C.
(c) To desalinate:
Put Na-ALE in SnakeSkin® dialysis tubing (3,500 MWCO*) with a volume capacity of (3.7 ml/cm); close the tubing ends by knotting or with tubing clips after edges folded over twice and leave overnight in a glass beaker with milliQ water while stirring.

Cold Extraction of ALE from Granular Sludge
1) Sieve the granular sludge to collect granules diameter more than 200 μm, then wash with tap water.
2) Remove the excess water using tissue paper placed under the sieve.
3) Before starting the extraction, take ±1 gram of sludge for dry weight determination. Measure the empty cup, the filled cup and put in the oven (105° C.) to dry. Weigh again if dried.
4) Prepare granules suspension in tap water with TSS of about 3%. This corresponds with 30-35 gram wet weight sludge in a total volume of 100 mL.
5) Add thick bleach solution to reach 10% (v/v).
6) Mix thoroughly and place the suspension at room temp or 4 c for 24 hours. Add aluminium foil to the top to prevent evaporation.
7) Collect the suspension in 50 mL tubes and centrifuge the liquor at 4500 rpm for 20 min. Collect the supernatant in a glass beaker and discard the pellet.
8) Adjust the supernatant pH to 2.5 by adding 4 M HCl on a magnetic stirrer. Gel formation can be noticed with foam. If there is no foam, keep adding HCl.
9) Collect the acidic gel in 50 mL tubes and discard the foam from the top (containing some insoluble solid impurities).
10) Centrifuge the acidic gel at 4500 rpm for 10 min, and then collect the pellet.
11) The acidic gel can be stored at 4° C. or frozen.

The gel can be further prepared according to purpose/client as indicated above in the hot extraction section.

ALE Molecular Weight Analysis

Size exclusion chromatography was performed with a Superdex 75 10/300 GL column (AKTA Purifier System, GE Healthcare). Elution was carried out at room temperature using Phosphate Buffer Saline (PBS) containing 10 mM ($HPO_4^{2-}$, $H_2PO_4^-$) with a pH of 7.4, and further having 2.7 mM KCl and 137 mM NaCl, at a constant 0.4 mL/min flow rate. The detection was monitored by following the absorbance of the eluted molecules at a wavelength of 210 nm.

The Superdex 75 10/300 GL column is capable of separating molecules of 1,000 to 70,000 Daltons (Da). Measurement of the elution volume of dextran standards (i.e. 1000 Da, 5000 Da, 12000 Da, 25000 Da and 50000 Da) led to the calibration equation:

$$\text{Log(MW)} = 6.212 - 0.1861\, Ve;$$

Wherein MW: Molecular Weight of the molecule in Dalton (Da), and Ve: elution volume in mL (assayed at the top of the peak).

Chromatogram profiles were recorded with UNICORN 5.1 software (GE Healthcare). Peak retention times and peak areas were directly calculated and delivered by the program.

Results

TABLE 1

Molecular weight of different fractions in alginate-like exopolysaccharides and their percentage.

| Elution volume of the peak (ml) | Molecular weight (kDa) | Percentage of the fraction (% peak area) |
|---|---|---|
| 7.83 | >70 | 29.74 |
| 13.48 | 14.4 | 18.82 |
| 15.57 | 5.79 | 45.15 |
| 17.58 | 2.15 | 4.42 |
| 20.13 | 0.656 | 1.87 |

Rheology Experiments

Viscosity is considered to be an important parameter for biopolymers, such as alginate. Rheology studies the phenomena that appear during deformation and flow of fluids, solids and of solid systems under the influence of external forces. Newton's law is considered to apply for fluids such as to ideal elastic and viscous materials.

Rheological experiments are performed to determine the viscosity versus the shear rate, the critical overlap concentration, the thermal stability and the salinity stability. The viscosity is measured as a function of shear rate using an AR-G2 Rheometer.

Materials and Method

The rheology experiments are performed in an AR-G2 Rheometer using Couette Geometry. The Rheometer is filled with 20 ml samples of the polymer solution Na-ALE in the desired concentrations and salinity's. The alginic acid is converted to the desired polymer solution (sodium alginate (Na-ALE)) by adding NaOH and deionized water.

To prepare the polymer solution samples for the rheology experiments a stock solution of the highest concentration is prepared first. Thereafter the highest concentration stock solution is diluted to the desired (lower) concentrations. The stock solution is prepared as follows:

The amount of alginic acid required is weighted with a mass balance.

Subsequently NaOH (0.1 N) is added gently to the solution to avoid particle agglomeration.

The solution is stirred and the pH is measured continuously.

NaOH (0.1 N) is added up to a final pH of approximately 8.3 and the solution is supplemented to the required volume with deionized water.

The beaker is stirred for 30 minutes at high speed and covered with aluminum foil to prevent contact with air.

Subsequently, the stirrer is reduced to medium speed and the solution is stirred and degassed for at least one day to create a homogeneous polymer solution in equilibrium and to guarantee hydration.

Finally the stock solution is diluted with deionized water to 20 ml of polymer solution to the desired concentrations.

Results

Figure 1B:
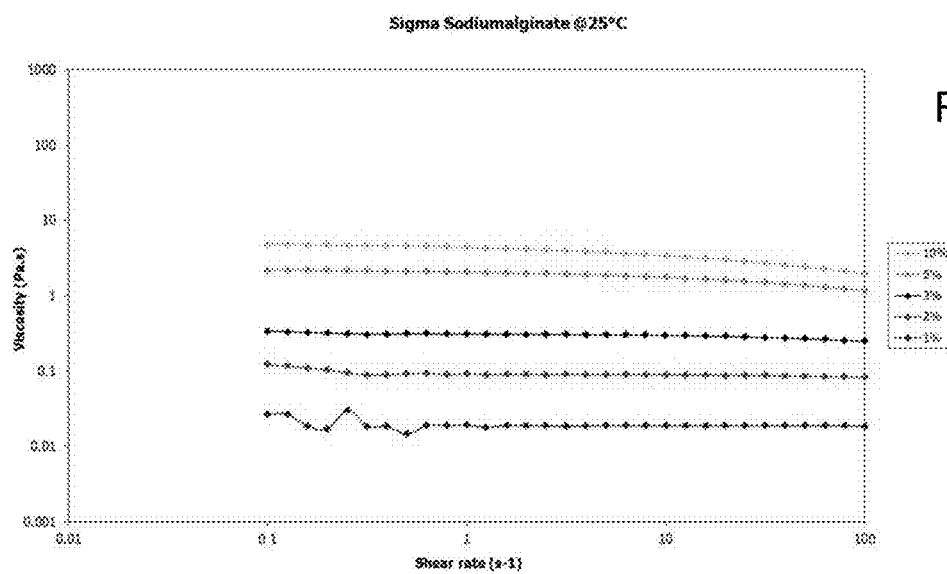
Figure 1C:
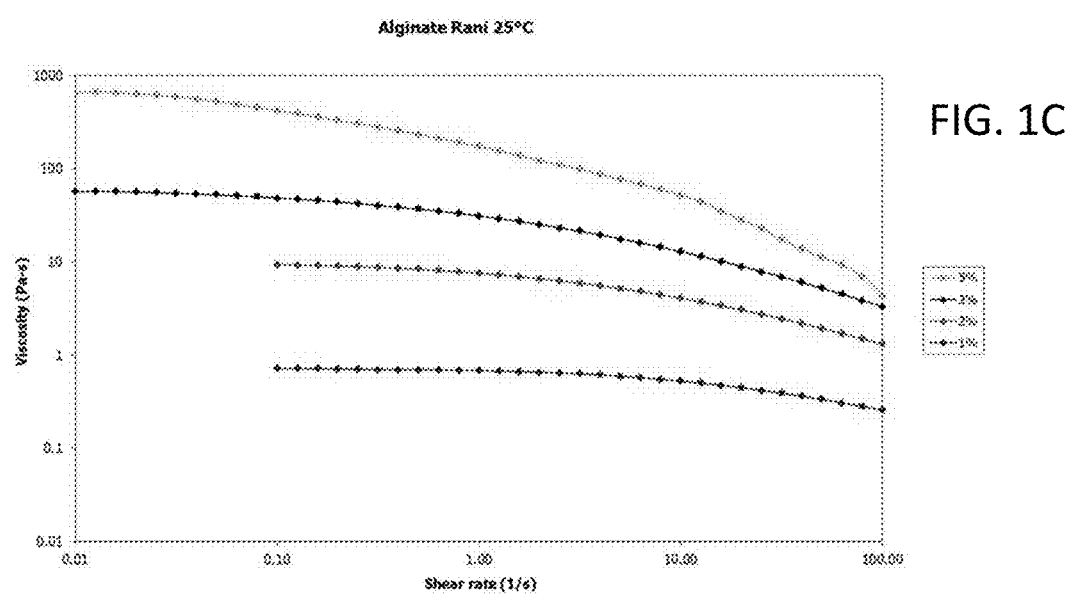

The viscosity of ALE and alginate solutions at various shear rates is shown in FIG. 1a-c). The viscosity (vertical axis, Pa*s) of ALE decreases as the shear rate increases (horizontal axis, 1/s). This is shown for four different solutions, from top to bottom, having 5%, 3%, 2%, and 1% alginate, respectively. Apparently the present solutions, comprising the present ALE, show non-Newtonian behavior in this respect.

In comparison, in FIG. 1b the viscosity of algae alginate is affected less by changing shear rate. This is shown for five different solutions, from top to bottom, having 10%, 5%, 3%, 2%, and 1% algae alginate, respectively.

Such is considered an indication that the solution of ALE is more pseudoplastic than that of comparable algae alginates. This property may provide advantages in processing, such as pumping and filling.

What is claimed is:

1. A method for extracting biopolymers from dense aggregates formed by microbial organisms, comprising the steps of:
   (i) producing dense aggregates comprising anionic biopolymers by bacteria, wherein the anionic biopolymer dense aggregate produced is a bacterial aerobic sludge or an anammox sludge of microbial cells self-immobilized through extracellular polymeric substances formed by microbial unicellular bacterial organisms, and providing the anionic biopolymer in dense aggregate aerobic sludge or anammox sludge, wherein the aerobic sludge or the anammox sludge comprises the extracellular polymeric substances,
   (iic) increasing the pH of the aerobic sludge or anammox sludge to 8.0-14.0 under addition to the aerobic sludge or anammox sludge of 1-20% v/v of at least one of $Cl_2$, $OCL^-$ and $H_2O_2$, (a) wherein the temperature is increased to 50-100° C., during a period of 10-60 min, or (b) wherein the temperature is maintained at 10-30° C., during a period of 60-2880 min, and discoloring the anionic biopolymer, and
   (iii) extracting the discoloured anionic biopolymer, the discoloured anionic biopolymer comprising exopolysaccharides.

2. The method according to claim 1, further comprising the step of (iia) after providing the aerobic sludge or anammox sludge removing dense aggregate particles with a diameter larger than 500 μm.

3. The method according to claim 1, further comprising the step of (iib) after providing the aerobic sludge or anammox sludge in step (i) removing water to a 1-40% w/v content of the wet aerobic sludge or anammox sludge.

4. The method according to claim 1, further comprising the step of (iiia) reducing a pH by addition of an acid to produce an acidic gel.

5. The method according to claim 4, further comprising (iiib) reducing the pH and thereafter removing the aerobic sludge or anammox sludge by at least one of physical separation, settling, centrifugation, cyclonic separation, decantation, filtration, sieving, and flotation, under suitable conditions.

6. The method according to claim 1, wherein the anionic biopolymer dense aggregate is selected from exopolysaccharide, block-copolymers comprising uronic acid residues, lipids, and combinations thereof.

7. The method according to claim 6, wherein the aerobic sludge or anammox sludge has been substantially produced by bacteria belonging to the order Pseudomonadaceae; or, by bacteria belonging to the order Plancto-mycetales; or combinations thereof.

8. The method according to claim 1, wherein step (iic) further comprises addition of at least one of
a salt comprising a base, and
an oxidant.

9. The method according to claim 1, wherein after step (iic) a suspension of the aerobic sludge or anammox sludge is centrifuged, during 10-45 minutes, and a supernatant is collected for further processing.

10. The method according to claim 4, wherein after step (iiia) the acidic gel is centrifuged, during 10-45 minutes, and a supernatant is collected for further processing.

11. The method according to claim 1, wherein the extracted discolored anionic biopolymer is further treated.

12. The method according to claim 1, wherein the extracted discolored anionic biopolymer has a number averaged weight of >10,000 Dalton.

13. The method according to claim 1, wherein the extracted discolored anionic biopolymer has >30% with a molecular weight of >300,000 Da, >10% with a molecular weight of >100,000 Da, >15% with a molecular weight of >5,000 Da, and <10% with a molecular weight of <5,000 Da.

* * * * *